July 31, 1962 W. A. STARCK 3,046,912
DISPENSERS FOR ICE CREAM OR THE LIKE
Filed April 7, 1960 2 Sheets-Sheet 2
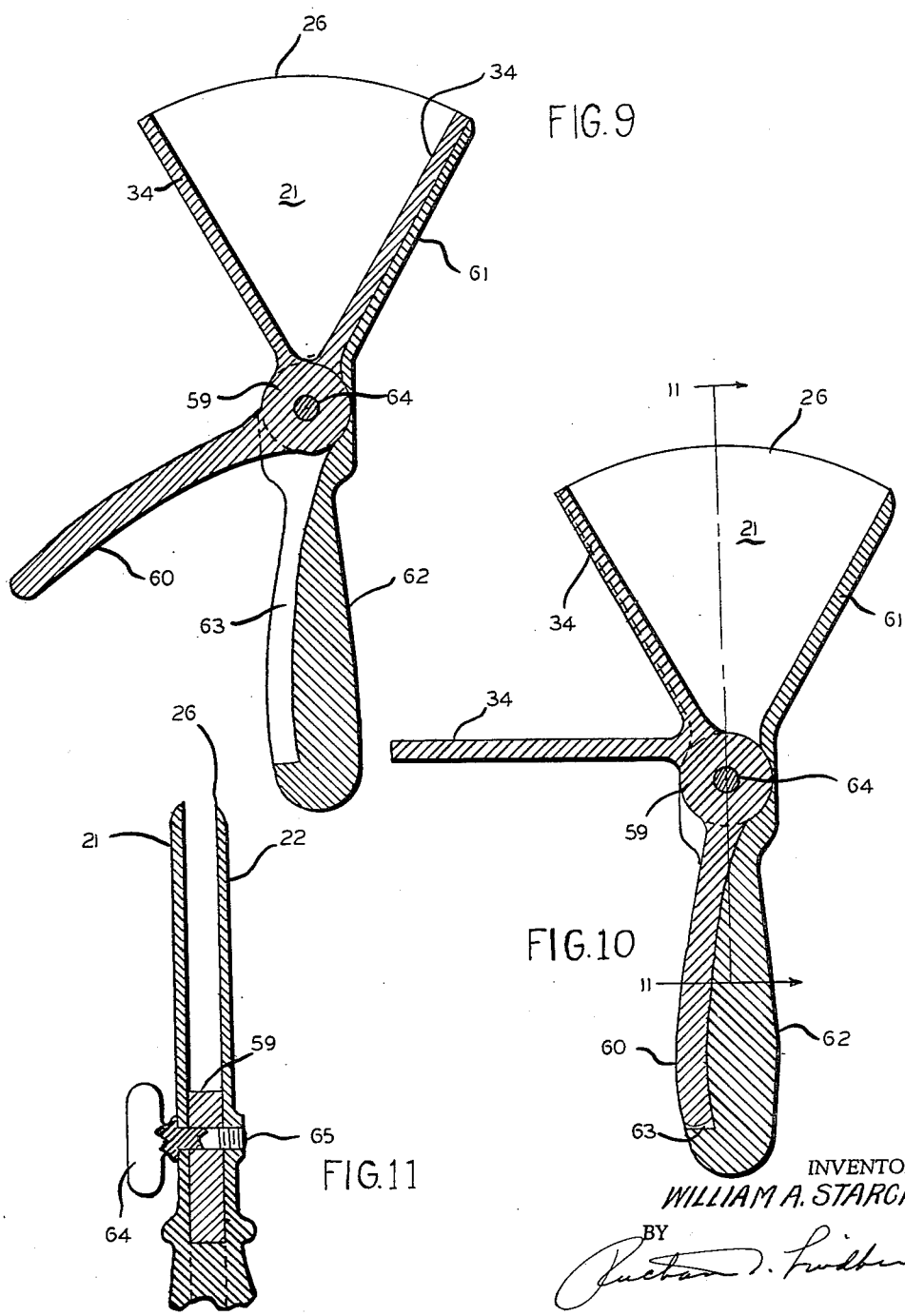
INVENTOR.
WILLIAM A. STARCK

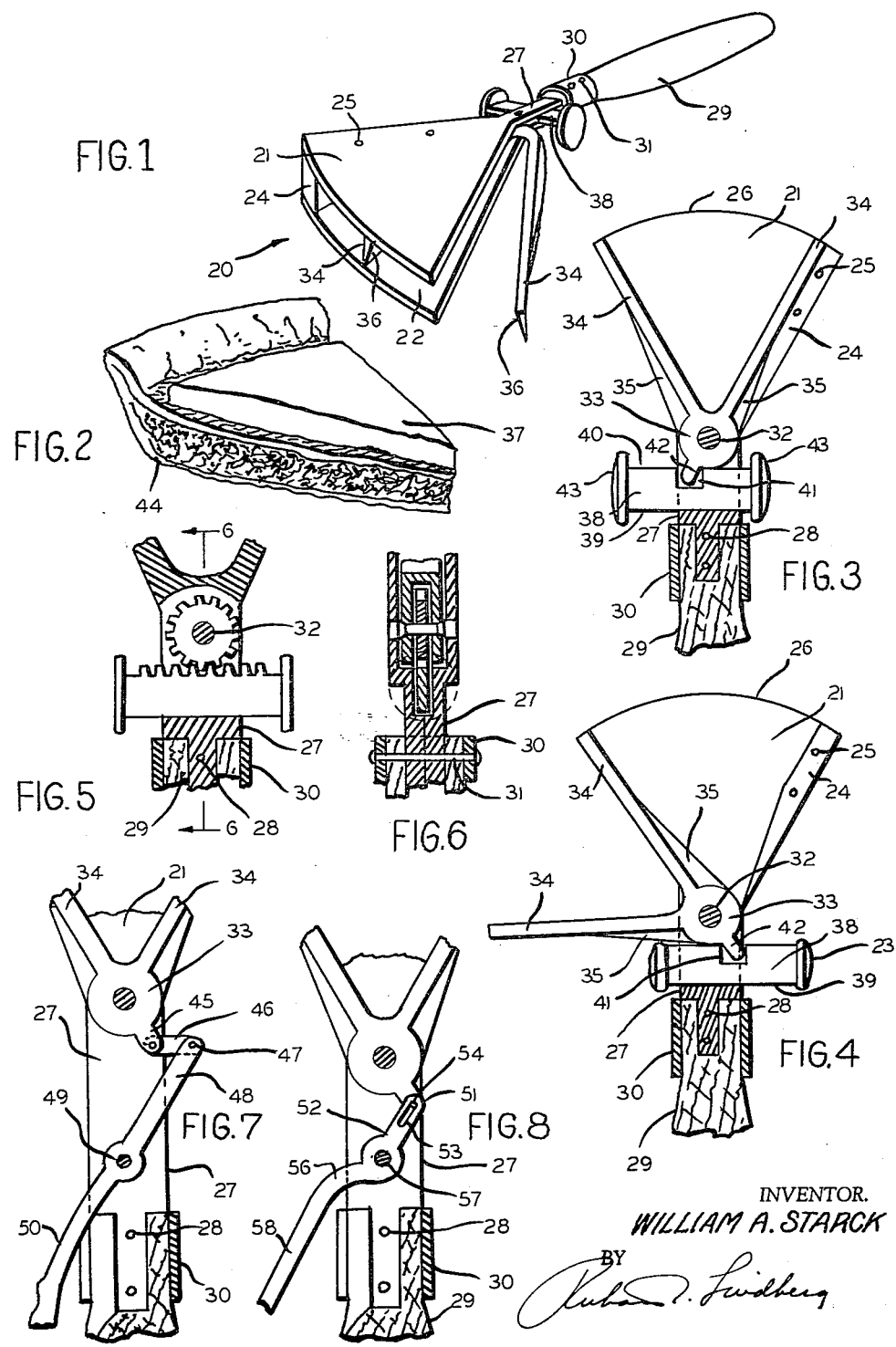

3,046,912
DISPENSERS FOR ICE CREAM OR THE LIKE
William A. Starck, 324 E. Wisconsin Ave.,
Milwaukee, Wis.
Filed Apr. 7, 1960, Ser. No. 20,661
5 Claims. (Cl. 107—48)

This invention relates to dispensers, and more particularly to a device for dispensing bulk ice cream or the like.

Pie a la mode, a desert consisting of pie and ice cream, is commonly served with a ball of ice cream placed on the surface of the pie. The pie being usually of a wedge or triangular shape, it is a prime object of this invention to provide a device which will permit depositing on the pie a flat portion of ice cream of even thickness, and of a triangular or wedge shape so as to cover substantially the surface of the pie.

Another object is to provide a device that will apply a flat, triangular shaped portion of ice cream on to the top surface of a piece of pie.

Yet another object is to provide a dispenser that is constructed of few parts, and is easily manipulated.

Still another object of this invention is to provide a dispenser that will allow the bulk ice cream of the like, to enter therein and pack into a solid mass for dispensing.

The device is simple in construction, easy to manipulate, consists of few moving parts, is easy to clean for sanitary purposes, and is highly efficient for the purpose intended.

Other and further objects of my invention will become more apparent as the description proceeds, when taken in conjunction with the drawings, in which:

FIG. 1 is a perspective view of the device constituting the invention, and shown in a partially open position, as when dispensing the ice cream or the like;

FIG. 2 shows a conventional wedge shaped piece of pie, with a flat wedge shaped portion of ice cream of even thickness placed thereon;

FIG. 3 is a fragmentary cross-sectional view of the device of FIG. 1 in a closed position;

FIG. 4 is a view similar to FIG. 3 with the device in a dispensing position;

FIG. 5 is a detailed view showing another embodiment of the invention;

FIG. 6 is a longitudinal sectional view taken along the line 6—6 of FIG. 5, and looking in the direction of the arrows;

FIG. 7 shows another embodiment of the invention;

FIG. 8 shows still another embodiment thereof;

FIG. 9 is a longitudinal cross-section taken through still another embodiment of the invention;

FIG. 10 is a view similar to FIG. 9, but showing the device in an open or dispensing position; and FIG. 11 is a longitudinal cross-sectional view taken along the line 11—11 of FIG. 10, looking in the direction of the arrows.

Referring now to the drawings, particularly FIGS. 1 to 4, the improved dispenser according to the present invention is referred to by the reference numeral 20, and consists of a pair of triangular shaped plates 21 and 22 which are secured to a spacer block 24 by rivets 25, or in any other convenient manner.

Plates 21 and 22 are generally in the form of like sectors of a circle with a somewhat blade like circular edge 26. A pair of shanks 27 each extend from what may be considered the apex of each plate 21 and 22, and the shanks 27 are recessed into a handle or grip 29, provided with a metal clamping band or ferrule 30 clamped to handle 29 by pins or rivets 31 passing through the ferrule 30 and holes 28 in the shanks 27, see also FIG. 3.

A shaft 32 held in the shanks 27 provides a pivot point for a dispensing fork consisting of a hub portion 33 and a pair of angularly spaced tines or fork members 34. A reinforcing rib 35 is provided on each tine 34 and extends to the hub 33. The proximate faces of the fork members 34 are not in parallel convergent places but are inclined toward each other as shown at 36, to enable a slab of ice cream 37 to be easily removed from therebetween when the fork members 34 are moved to a position from between the plates 21 and 22 as seen in FIG. 4.

Structure is provided for rocking the tines 34 to the dispensing position seen in FIG. 4, and to this end a movable rack 38 seen in FIGS. 3 and 4 is provided. Rack 38 is supported between the shanks 27 an edge 39 thereof bearing against the shanks 27. An upper edge 40 of rack 38 has a recess 41 engaging a rocking arm 42 extending from the hub portion 33. Each end of the rack 38 is provided with an actuating button 43 so that the rack 38 can be moved manually in either direction, see FIGS. 3 and 4.

When the rack 38 is in the position seen in FIG. 3, the fork members 34 are in position with the plates 21 and 22 to define an open recess, the open end thereof being adapted to be forced into a mass of ice cream and form a wedge shaped mass 37 of ice cream in the recess defined by the fork members 34 and the plates 21 and 22. When the rack 38 is moved to a position shown in FIG. 4, the fork members 34 move to a position outside the plates 21 and 22 to dispense the ice cream 37 on to the pie 44 seen in FIG. 2.

Referring now to FIGS. 7 and 8, there is shown a modified construction employing levers instead of the rack 38. In FIG. 7, the hub portion 33 has an extension 45 therefrom connected to a link 46 which in turn is attached at 47 to a rocking lever 48 pivoted at 49 to the shanks 27. The free end of the rocking lever is provided with a grip 50. It will be seen that rocking of the lever 48 causes the dispensing fork members 34 to rock to dispensing position.

Referring to FIG. 8, a rocking lever 52 has its upper end 51 provided with a slot 53 which engages a pin 54 fastened to extension member 45. Pin 54 and slot 53 provide a connection whereby a rocking lever 56 pivoted at 57 to the shanks 27 and having a grip 58 can be rocked to dispensing position of the fork members 34.

Referring now to FIGS. 9, 10 and 11 of the drawings, a preferred embodiment of the invention is shown. The embodiment of the invention consists of two working parts, a body member consisting of the spaced sector plates 21 and 22 which are cast integrally with a wall member 61. The fork members 34 are also cast integrally with a hub 59 which is pivoted to the body member by a pin 64. The body member has a handle 62 extending from the plates 21 and 22 and wall member 61, and the handle 62 is provided with a recess 63 receiving a handle or grip extending from the hub 59.

It will be seen in FIG. 9 that the parts just described are positioned for insertion in a mass of ice cream to form a wedge shaped portion of ice cream between the fork members 34 and plates 21 and 22. The fork members 34 are then moved to the dispensing position seen in FIG. 10, the ice cream being dispensed or placed on to the top surface of the portion of pie.

From the above description it is believed evident that there has been provided a new and improved device for dispensing bulk ice cream in the form of a flat wedge shaped portion on to a piece of pie. The device is exceedingly simple in construction, economical to manufacture and easy to manipulate and although I have shown different embodiments of my invention I am fully cognizant that many changes may be made in the form, shape and contour of the parts constituting the device without effecting their operativeness and efficiency, and I reserve such other embodiments as they may be embraced by the spirit and scope of the claims.

Having thus described my invention, what I claim and desire to secure by Letters Patent in the United States, is:

1. In a device of the character described, a pair of spaced plate members, handle means for supporting said plate members in such spaced relationship, said plate members being shaped as sectors of a circle and having generally blade-like edges adapted to enter a mass of plastic consistency, dispensing means adapted to be positioned between said plate members and having converging wall members to define a generally wedge shaped recess with said plate members for receiving a mass of said plastic material and to be moved to a position where said mass is discharged from said dispenser means, a hub joining said converging wall members and adapted to pivot in said handle means at a point substantially near where said plate members are joined to said handle means, and an actuator extending from said hub for moving said converging wall members to a position where said plastic mass can freely move from between said wall members.

2. In a device of the character described, a pair of spaced plate members, handle means for supporting said plate members in such spaced relationship, said plate members being shaped as sectors of a circle and having generally blade-like edges adapted to enter a mass of plastic consistency, dispensing means adapted to be positioned between said plate members and having converging wall members to define a generally wedge shaped recess with said plate members for receiving a mass of said plastic material and to be moved to a position where said mass is discharged from said dispenser means, said dispensing means comprising a pair of convergent walls, a hub joining said converging wall members and adapted to pivot in said handle means at a point substantially near where said plate members are joined to said handle means, and means extending from said hub for moving said converging wall members to a position where said plastic mass can freely move from between said wall members.

3. In a device of the character described, a pair of spaced plate members, handle means for supporting said plate members in such spaced relationship, said plate members having generally blade-like edges adapted to enter a mass of plastic consistency, dispensing means adapted to be positioned between said plate members to define a recess with said plate members for receiving a mass of said plastic material and to be moved to a position where said mass is discharged from said dispenser means, said dispensing means comprising a hub and a pair of convergent walls extending therefrom, means for supporting said dispensing means on said handle means for pivotal movement with respect to said plate members to receiving and discharging positions of said mass, and means for moving said dispensing means to and from said positions comprising an actuating lever pivoted on said handle means, and a connection between said actuating lever and said dispensing means whereby upon rocking of said actuating lever said dispensing means will be moved to and from dispensing position.

4. In a device of the character described, a pair of spaced plate members, handle means for supporting said plate members in such spaced relationship, said plate members having generally blade-like edges adapted to enter a mass of plastic consistency, dispensing means adapted to be positioned between said plate members to define a recess with said plate members for receiving a mass of said plastic material and to be moved to a position where said mass is discharged from said dispenser means, said dispensing means comprising a hub and a pair of convergent walls extending therefrom, means for supporting said hub and walls for pivotal movement with respect to said plate members to receiving and discharging positions of said mass, and means for moving said dispensing means to and from said positions comprising a rack movable with respect to said handle means, and means extending from said dispensing means and engageable by said rack for moving said dispensing means pivotally.

5. In a device of the character described, a pair of spaced plate members, handle means for supporting said plate members in such spaced relationship, said plate members having generally blade-like edges adapted to enter a mass of plastic consistency, dispensing means adapted to be positioned between said plate members to define a recess with said plate members for receiving a mass of said plastic material and to be moved to a position where said mass is discharged from said dispenser means, said dispensing means comprising a hub and a pair of convergent walls extending therefrom, means for supporting said hub and convergent walls for pivotal movement with respect to said plate members to receiving and discharging positions of said mass, and means for moving said dispensing means to and from said positions.

References Cited in the file of this patent

UNITED STATES PATENTS

| 1,162,116 | Walker | Nov. 30, 1915 |
| 1,620,110 | Landman | Mar. 8, 1927 |
| 1,769,218 | Garvis | July 1, 1930 |